US011397692B2

(12) United States Patent
Chhabra et al.

(10) Patent No.: US 11,397,692 B2
(45) Date of Patent: Jul. 26, 2022

(54) LOW OVERHEAD INTEGRITY PROTECTION WITH HIGH AVAILABILITY FOR TRUST DOMAINS

(71) Applicant: Intel Corporation, Santa Clara, CA (US)

(72) Inventors: Siddhartha Chhabra, Portland, OR (US); Rajat Agarwal, Portland, OR (US); Baiju Patel, Portland, OR (US); Kirk Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 16/023,576

(22) Filed: Jun. 29, 2018

(65) Prior Publication Data

US 2019/0042476 A1 Feb. 7, 2019

(51) Int. Cl.
| | | |
|---|---|---|
| *G06F 12/14* | (2006.01) | |
| *G06F 21/78* | (2013.01) | |
| *G06F 21/60* | (2013.01) | |
| *H04L 9/32* | (2006.01) | |
| *G06F 21/64* | (2013.01) | |

(Continued)

(52) U.S. Cl.
CPC ........ *G06F 12/1408* (2013.01); *G06F 12/145* (2013.01); *G06F 21/53* (2013.01); *G06F 21/602* (2013.01); *G06F 21/64* (2013.01); *G06F 21/78* (2013.01); *G06F 21/85* (2013.01); *H04L 9/14* (2013.01); *H04L 9/3242* (2013.01);

(Continued)

(58) Field of Classification Search
CPC ...... G06F 12/1408; G06F 21/85; G06F 21/53; G06F 21/64; G06F 21/602; G06F 21/78; G06F 12/145; G06F 9/45558; G06F 2009/45579; H04L 9/14; H04L 9/3242; H04L 2209/34

See application file for complete search history.

(56) References Cited

U.S. PATENT DOCUMENTS 6,000,832 A * 12/1999 Franklin ................ G06Q 20/04
235/379
2006/0161773 A1* 7/2006 Okazaki .................. G06F 21/79
713/168

(Continued)

OTHER PUBLICATIONS

U.S. Appl. No. 15/705,562, filed Sep. 15, 2017.
U.S. Appl. No. 15/7635,548, filed Jun. 28, 2017.

*Primary Examiner* — Sanchit K Sarker
(74) *Attorney, Agent, or Firm* — Alliance IP, LLC

(57) ABSTRACT

Techniques are described for providing low-overhead cryptographic memory isolation to mitigate attack vulnerabilities in a multi-user virtualized computing environment. Memory read and memory write operations for target data, each operation initiated via an instruction associated with a particular virtual machine (VM), include the generation and/or validation of a message authentication code that is based at least on a VM-specific cryptographic key and a physical memory address of the target data. Such operations may further include transmitting the generated message authentication code via a plurality of ancillary bits incorporated within a data line that includes the target data. In the event of a validation failure, one or more error codes may be generated and provided to distinct trust domain architecture entities based on an operating mode of the associated virtual machine.

21 Claims, 6 Drawing Sheets

(51) Int. Cl.
  *H04L 9/14* (2006.01)
  *G06F 21/53* (2013.01)
  *G06F 21/85* (2013.01)
  *G06F 9/455* (2018.01)

(52) U.S. Cl.
  CPC ............ *G06F 9/45558* (2013.01); *G06F 2009/45579* (2013.01); *H04L 2209/34* (2013.01)

(56) References Cited

U.S. PATENT DOCUMENTS

| | | | |
|---|---|---|---|
| 2015/0370727 A1* | 12/2015 | Hashimoto | G06F 21/64 711/163 |
| 2016/0378687 A1* | 12/2016 | Durham | H04L 9/3242 713/193 |
| 2016/0378688 A1* | 12/2016 | Rozas | G06F 12/1441 713/190 |
| 2018/0091308 A1* | 3/2018 | Durham | G06F 12/1408 |
| 2019/0004973 A1 | 1/2019 | Chhabra et al. | |
| 2019/0042750 A1* | 2/2019 | August | G06F 9/3814 |
| 2019/0087575 A1* | 3/2019 | Sahita | H04L 9/0618 |
| 2019/0103976 A1* | 4/2019 | Chhabra | G06F 21/6218 |
| 2019/0182040 A1* | 6/2019 | Hunt | G06F 21/602 |

* cited by examiner

LOW OVERHEAD INTEGRITY PROTECTION WITH HIGH AVAILABILITY FOR TRUST DOMAINS

TECHNICAL FIELD

The present disclosure relates to cryptographic memory isolation for multi-user computing environments, and more particularly, to techniques for protecting against integrity failure with respect to such cryptographic memory isolation.

BACKGROUND

An increasing demand for robust computer security has led to widespread use of cryptography in mainstream computer systems and networks, along with the development of increasingly sophisticated and secure modern cryptography techniques. For example, disk encryption can be used to protect data residing on a persistent disk storage device, while network encryption can be used to protect data transmitted over a network. Data residing in system memory, however, is often stored and/or transmitted in plaintext and thus may be vulnerable to attacks. For example, attackers can use a variety of techniques to maliciously access data stored in memory, such as bus scanning and/or memory scanning, among other examples. Moreover, in some cases, these malicious techniques could be used to access memory locations containing encryption keys that are stored in plaintext, such as encryption keys used for disk encryption, thus facilitating further unauthorized access to other data that is protected by encryption.

Cryptographic memory isolation for user workloads is therefore significantly advantageous in cloud computing and other multi-user scenarios, such as to prevent processes initiated by one user of one or more computing systems from gaining access to processes and data owned by (or otherwise associated with) other users of those same computing systems. Recent public disclosures regarding various flaws in existing processing and data protection have emphasized the importance of such cryptographic isolation.

Traditional approaches to ensuring the integrity of user data and processing in such scenarios typically suffer from various disadvantages. For example, memory integrity approaches that associate a message authentication code (MAC) with each data line generally cause significant storage, performance, and bandwidth overheads by necessitating the loading and verification of such a MAC with each data line access. Moreover, typical responses to a detection of integrity failure under such approaches result in security exceptions that generally result in halting operations for all processes within a target computing system. While this solution is generally considered acceptable in a single-client platform, such an interruption in multi-user platforms may directly and negatively impact platform availability—and may result in significant data, revenue, and/or productivity loss.

Thus, solutions are needed to provide and enforce cryptographic isolation for multi-user computing scenarios while minimizing additional overhead resulting from such cryptographic isolation, and to do so with minimal interruption of the associated computing system or systems involved.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
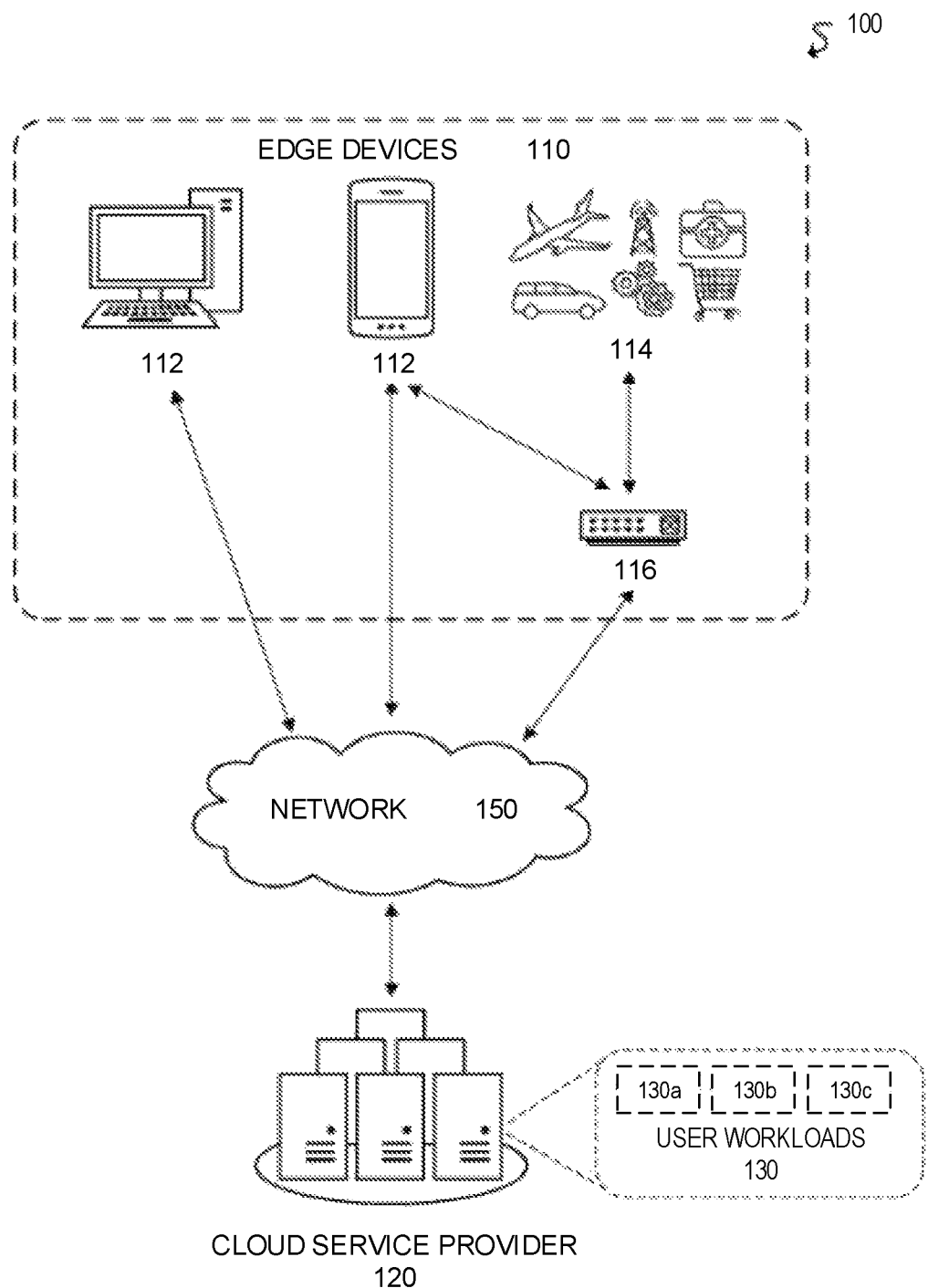
FIG. 1 is a schematic diagram of an exemplary networked computing environment in accordance with an embodiment of at least some of the techniques described herein.

Although the following Detailed Description will proceed with reference being made to illustrative embodiments, many alternatives, modifications and variations thereof will be apparent to those skilled in the art.

DETAILED DESCRIPTION

In the description herein, numerous specific details are set forth, such as may include examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Techniques described herein are generally directed to various embodiments of cryptographic memory protection. Such embodiments may be used to provide memory encryption protection, thus providing an additional layer of security by mitigating vulnerabilities associated with unprotected or insecure memory. For example, in some embodiments, memory encryption may be provided by implementing a cryptographic engine or controller on the memory path or memory bus. In this manner, data may be encrypted and protected while residing in memory and during transmission to and from memory (e.g., when transmitted from memory to a processor, and vice versa, via the memory bus or memory path). However, while memory encryption may be a necessity for certain users and/or use cases, uniform memory protection across a computing system may be insufficient in certain circumstances. For example, a CSP often hosts data and/or applications—or workloads—for multiple users or third parties. Moreover, the CSP could use memory encryption to provide uniform protection of all hosted user workloads, for example, using a single encryption key. However, simply providing uniform memory encryption protection for all hosted workloads—without differentiating between the workloads of different users—may be insufficient. For example, a CSP and/or its users may be averse to sharing the same encryption key for all users. Rather, the CSP and/or its users may prefer to have memory encryption provided on a per-tenant basis (e.g., per user or per virtual machine) to ensure that each user workload is separately protected and isolated using a unique encryption key.

Accordingly, the described embodiments provide memory encryption that supports multiple keys and is configurable or programmable. The number of supported keys, for example, can be implementation-dependent. In some embodiments, for example, a memory protection engine can be configured or programmed (e.g., by software) to encrypt different regions or pages of memory using different encryption keys and/or algorithms. For example, in some embodiments, a user or tenant (e.g., a CSP or user) can designate a protection mode for a particular region or page of memory as either plaintext (e.g., unencrypted), standard or default encryption protection (e.g., encrypted using a default or global encryption key), or custom encryption protection (e.g., encrypted using a unique encryption key). In this manner, memory encryption can be provided and configured separately for different tenants, users, or protection domains. In some embodiments, for example, a "domain" may be viewed as a collection of resources associated with a particular workload, which may include any regions of memory containing data associated with the workload. Moreover, memory encryption can be configured separately for each domain, thus allowing each domain or workload to be protected using a separate encryption key. In this manner, cryptographic isolation can be achieved for workloads of different users. Moreover, the workloads can also be isolated from management software (e.g., of a CSP), such as a virtual machine manager. Domains can also be configured in plaintext mode, as it may be undesirable in certain circumstances to perform memory encryption for a particular domain (e.g., to avoid performance impacts of memory encryption, share memory (and I/O) between different entities, reclaim memory, and so forth).

The described embodiments may provide numerous features and advantages, including cryptographic memory protection (e.g., via a cryptographic engine on the memory path), multi-key encryption support, and software programmable configurability and flexibility. These features enable isolated encryption protection using separate keys for different domains, memory regions, workloads, tenants, and/or users, thus providing support for multiple cryptographically-isolated protection domains. In this manner, the described embodiments can be used to satisfy heightened security requirements for certain users and/or use cases, such as CSPs with hosted workloads of multiple third-parties or users. The described embodiments can also be used to leverage the performance benefits of using memory for persistent data storage (e.g., NVDIMM or other storage class memory (SCM)) without sacrificing security.

Thus, the present disclosure is directed to techniques for providing cryptographic memory isolation within a multi-user computing system, such as computing systems used for "cloud computing" or other distributed computing platforms, and such as may be used in conjunction with multiple encryption keys and/or additional techniques related to MKTME (Multi-Key Total Memory Encryption) operations. Such techniques may include providing a Message Authentication Code (MAC) construction with minimal performance overhead, as well as providing secure notification to trusted to software applications of any integrity failures, allowing such trusted software to take corrective action (such as based on one or more software policies). Such techniques may additionally be used to protect against memory invasion attacks such as splicing, spoofing (or relocation), and cross-domain attacks.

Techniques described herein may, in at least some embodiments, include implementing a low-overhead memory integrity solution by repurposing or otherwise utilizing ancillary bits (such as error-correcting code (ECC) bits or other bits transmitted with data on the memory bus rather than requiring a separate fetch from additional storage) to transmit a MAC without incurring the operational overhead associated with a separate fetch. As one non-limiting example, various server platforms implement several RAS features and performance optimizations which require bits travelling over the memory bus with the data line. As described in greater detail elsewhere herein, such bits may be repurposed to include an embedded MAC. Moreover, in various embodiments, one or more users may be enabled to explicitly "opt in" to such techniques, such as if the utilization of such ancillary bits for secure MAC transmission is deemed less desirable than other features for which such ancillary bits may be utilized. However, the utilization of such ancillary bits traveling with data may not incur any additional memory accesses (and corresponding bandwidth resources). Therefore, in such embodiments, the described techniques may not require the use of additional ECC or other memory, and thus may eliminate or reduce various costs associated with such use.

In at least some embodiments, a MAC transmitted via such ancillary bits may be specially constructed in order to mitigate or prevent various classes of attacks, such as attacks that may be performed by one or more attackers with physical access to a multi-user system. As non-limiting examples, such attacks may include spoofing (in which an attacker is able to modify a cache line in memory or over the memory bus); splicing (in which an attacker is able to swap cache lines between different physical locations); and cross-domain attacks (in which an attacker is able to record ciphertext and/or a corresponding MAC of one user or VM and validly utilize it for another user or VM at a later time).

Techniques described herein may in certain embodiments further include providing a novel response to memory integrity failures in the form of a page fault code to indicate the occurrence of such a memory integrity failure to trusted software applications. In this manner, a trusted software application may be enabled to respond to the memory integrity failure, and yet avoid a system reset that might otherwise result from such a failure. In at least some embodiments, the techniques described herein are provided as cryptographically secure and include support for multiple encryption keys/MKTME (Multi-Key Total Memory Encryption), replay prevention, and cryptographically strong data corruption detection, even by an attacker with physical access to the computing system.

As used herein, the term "device" may refer to a memory-based integrated circuit or other circuitry component, and may include any suitable hardware or logic chip for storing a predetermined number of bits in a storage device. Unless context clearly indicates otherwise, as used herein the terms "user," "customer" and "tenant" may be utilized interchangeably. Also as used herein, "per-tenant" keys and/or workloads may refer to per-user, per-domain, or other appropriate segmentation of such keys and/or workloads. As used herein, the Trusted Computing Base (TCB) of a system refers to a set of hardware, firmware, and/or software components that have an ability to influence the trust for the overall operation of the system. Also as used herein, a "domain" may be viewed as a collection of resources associated with a particular workload or execution context, which may include any regions of memory containing data associated with the workload.

Techniques described herein provide for cryptographically secure memory isolation methods, while maintaining error correcting capabilities, to provide high performance memory that can mitigate random bit errors, memory based integrated circuit failures, and malicious adversaries. A memory based integrated circuit, also referred to herein as a device, can include any suitable hardware or logic chip for storing a predetermined number of bits in a storage device. The techniques described herein are cryptographically secure and ensure memory integrity, including via support for multiple encryption key approaches such as MKTME (Multi-Key Total Memory Encryption), replay prevention, and cryptographically strong data corruption detection even by a physical adversary. Additionally, the techniques described herein may not require the use of additional ECC memory, and, thus, reduce memory costs. Thus, such techniques may be used in various embodiments in conjunction with or in lieu of other ECC detection mechanisms.

In some embodiments, a computing device can store a first MAC based on data stored in system memory in response to a write operation to the system memory. A MAC as referred to herein can include any suitable message authentication code involving a cryptographic hash function and a secret cryptographic key. In some embodiments, the computing device can also detect a read operation corresponding to the data stored in the system memory and calculate a second MAC based on the data stored in the system memory. The computing device can also determine that the second MAC does not match the first stored MAC and recalculate the second MAC (subsequent in various embodiments to a correction operation). Furthermore, the computing device can decrypt the data stored in the system memory in response to detecting the recalculated second MAC matches the first MAC, and transmit the decrypted data to cache.

FIG. 1 illustrates a schematic diagram of an exemplary networked computing environment 100 in accordance with an embodiment of various techniques described herein. In various embodiments, the networked computing environment 100 and/or its underlying components may include certain cryptographic memory protection functionality, as described throughout this disclosure. For example, a cloud service provider (CSP) 120 may host workloads 130 (e.g., data and/or applications) for multiple users or third parties. Accordingly, in some embodiments, a CSP 120 may implement multi-key cryptographic memory protection to provide memory encryption on a per-tenant basis, thus ensuring that each user workload 130 is separately protected and isolated using a unique encryption key. Cryptographic memory protection can also be implemented by other components of networked computing environment 100, such as edge devices 110. Exemplary embodiments of cryptographic memory protection are described further throughout this disclosure.

Edge devices 110 may include any equipment and/or devices deployed or connected near the "edge" of a communication network 150. In the illustrated embodiment, edge devices 110 include end-user devices 112 (e.g., desktops, laptops, mobile devices), Internet-of-Things (IoT) devices 114, and gateways and/or routers 116, among other examples. Edge devices 110 may communicate with each other and/or with other remote networks and services (e.g., cloud services 120) through one or more networks and/or communication protocols, such as the communication network 150. Moreover, one or more of the edge devices 110 may include one or more embodiments of the cryptographic memory protection functionality described throughout this disclosure.

End-user devices 112 may include any device that enables or facilitates user interaction with computing networked computing environment 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of networked computing environment 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of networked computing environment 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, biometric properties, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/ actuators. IoT devices 114 may include, for example, any type of equipment and/or devices associated with any type of networked computing environment 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data and application hosting, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in some embodiments, certain cloud services 120 may include the cryptographic memory protection functionality described throughout this disclosure. For example, a CSP 120 often hosts workloads 130 (e.g., data and/or applications) for multiple users or third parties. Accordingly, in some embodiments, a CSP 120 may implement multi-key cryptographic memory protection to provide memory encryption on a per-tenant basis, thus ensuring that each user workload 130 is separately protected and isolated using a unique encryption key.

Network 150 may be used to facilitate communication between the components of computing networked computing environment 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of networked computing environment 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within networked computing environment 100 of FIG. 1 may be utilized in each alternative implementation of the present disclosure. Additionally, one or more of the elements described in connection with the examples of FIG. 1 may be located external to networked computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
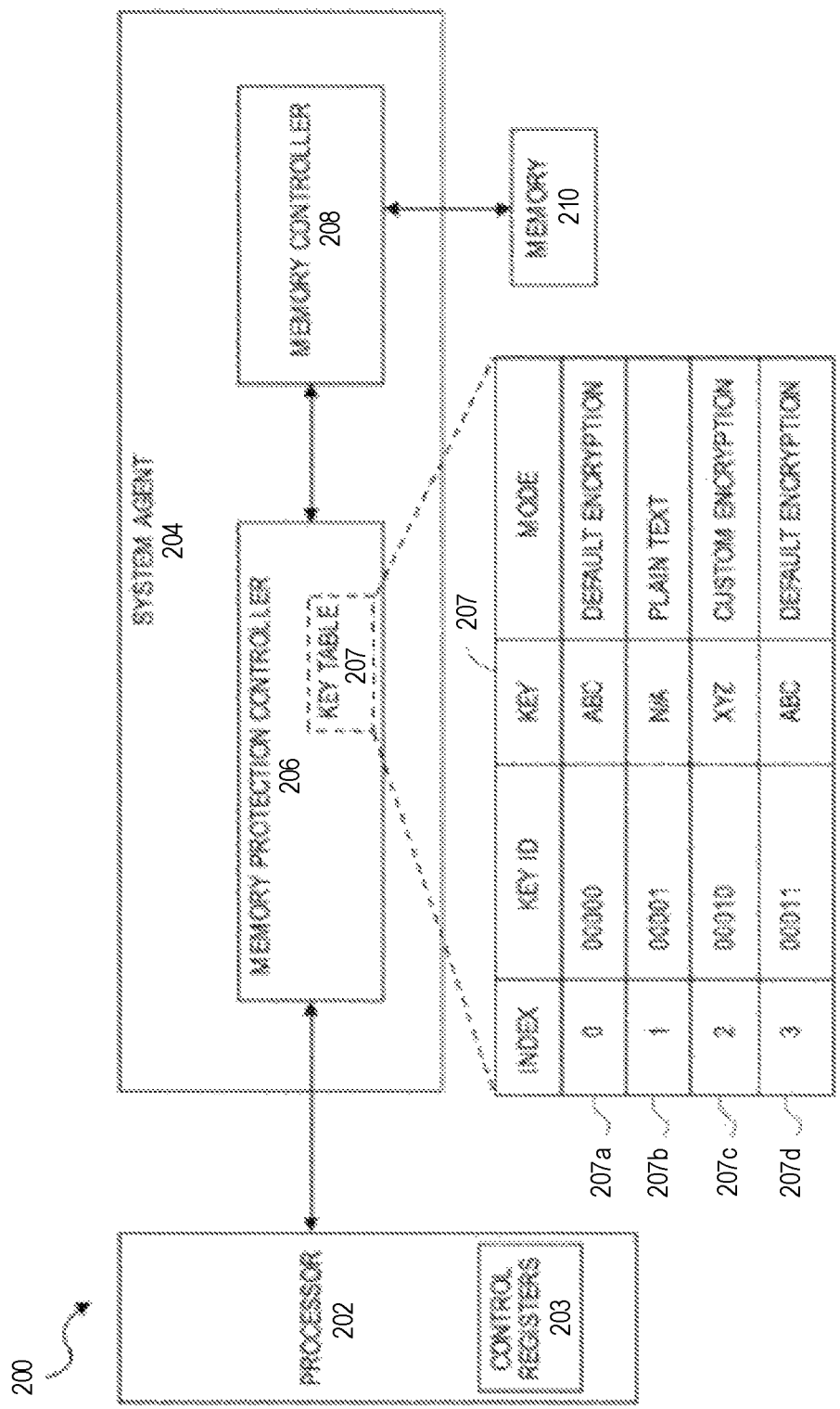
FIG. 2 illustrates an exemplary embodiment of a multi-key cryptographic memory protection system in accordance with at least some of the techniques presented herein.

FIG. 2 illustrates an exemplary embodiment of a multi-key cryptographic memory protection system 200. In the illustrated embodiment, memory protection system 200 includes processor 202, system agent 204, and memory 210.

As described further below, memory protection system 200 provides cryptographic protection of data stored on memory 210.

Processor 202 may be used to execute instructions, code, and/or any other form of logic or software, such as instructions associated with a software application. Processor 202 may include any combination of logic or processing elements operable to execute instructions, whether loaded from memory or implemented directly in hardware, such as a microprocessor, digital signal processor, field-programmable gate array (FPGA), graphics processing unit (GPU), programmable logic array (PLA), or application-specific integrated circuit (ASIC), among other examples. In some embodiments, for example, processor 202 and/or memory protection system 200 may be implemented using the computer architectures of FIGS. 6-10.

Memory 210 may be used to store information, such as code and/or data used by processor 202 during execution, and/or persistent data associated with an application or user of system 200. Memory 210 may include any type or combination of components capable of storing information, including volatile memory (e.g., random access memory (RAM), such as dynamic RAM (DRAM), synchronous dynamic RAM (SDRAM), and static RAM (SRAM)) and/or non-volatile memory (e.g., storage class memory (SCM), direct access storage (DAS) memory, non-volatile dual in-line memory modules (NVDIMM), and/or other forms of flash or solid-state storage).

System agent 204 may be used to provide various functions for processor 202, such as managing access to memory 210 and/or other resources of system 200. In the illustrated embodiment, for example, system agent 204 includes a memory controller 208 to control and/or manage access to memory 210 of system 200. Moreover, as described further below, system agent 204 also includes a memory protection controller 206 to protect data stored on memory 210. In some embodiments, system agent 204 may also provide an interface between processor 202 and other components of system 200 (e.g., using a direct media interface (DMI) and/or PCI-Express bridge). In various embodiments, system agent 204 may include any combination of logic elements configured to perform functionality of system agent 204 described herein, whether loaded from memory or other non-transitory computer readable medium, or implemented directly in hardware, including by way of non-limiting examples: a microprocessor, digital signal processor (DSP), field-programmable gate array (FPGA), graphics processing unit (GPU), programmable logic array (PLA), application-specific integrated circuit (ASIC), and/or virtual machine (VM) processor. System agent 204 may be integrated with processor 202, or alternatively, system agent 204 may be implemented on a separate chip communicatively coupled or connected to processor 202.

Memory controller 208 may be used to control and/or manage access to memory 210 of system 200. In various embodiments, memory controller 208 may be implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

In the illustrated embodiment, system 200 provides cryptographic memory protection for memory 210. In some embodiments, for example, cryptographic memory protection may be implemented by extending and/or modifying a particular computer architecture. For example, cryptographic memory protection may be implemented by extending the functionality of a processor 202 and/or introducing a memory protection controller 206. In the illustrated embodiment, for example, processor 202 is extended to support control registers 203 and processor instruction(s) that can be used to enable and/or configure cryptographic memory protection, and memory protection controller 206 is implemented to provide the cryptographic memory protection. Although the illustrated example uses separate logical blocks to depict memory protection controller 206 and processor 202, in actual embodiments memory protection controller 206 and processor 202 may be integrated together or alternatively may be implemented as separate components. In various embodiments, for example, memory protection controller 206 may be implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

Memory protection controller 206 uses memory encryption to protect data stored on memory 210. In some embodiments, for example, memory protection controller 206 may be implemented on the memory path or memory bus to allow encryption of data transmitted to and from, and/or stored on, memory 210. Moreover, in some embodiments, memory protection controller 206 may be configurable or programmable, and may include support for multiple encryption keys. Accordingly, memory protection controller 206 may be configured or programmed (e.g., by software) to encrypt different regions or pages of memory 210 using different encryption keys and/or algorithms. In this manner, memory encryption can be provided and configured separately for different users, tenants, customers, applications, and/or workloads.

For example, in some embodiments, memory protection controller 206 may be used to define various secured or protected domains that can be separately configured and protected using memory encryption. In some embodiments, for example, a "domain" may be viewed as a collection of resources associated with a particular workload (e.g., a workload of a particular user or application), and may include any regions of memory containing data associated with the workload. For example, a protected domain for a customer workload of a cloud service provider may include resources (e.g., memory) associated with an operating system (OS), virtual machine (VM) (e.g., a VM running on a virtual machine manager (VMM)), and/or any ring-3 applications running on the OS or VM. Memory protection controller 206 may allow the protected domains to be configured and protected separately, thus allowing each protected domain to be cryptographically isolated in memory by encrypting its associated code and/or data with a unique encryption key. In this manner, the workloads of different users, customers, and/or tenants can be cryptographically isolated by defining different protection domains for the various workloads.

In some embodiments, the cryptographic memory protection of system 200 may be discovered and configured using processor instructions and/or hardware registers. For example, in some embodiments, a processor instruction may be used to determine whether cryptographic memory protection is supported by system 200, such as a CPU identification (CPUID) instruction used by software to identify the capabilities of a particular processor.

Upon determining that cryptographic memory protection is supported by system 200, the cryptographic memory protection may then be enabled and/or configured using hardware registers, such as control registers 203 of processor 202. For example, control registers 203 may include various model-specific registers (MSRs) that allow software to discover, enable, and/or configure the cryptographic memory protection capabilities of system 200. In some embodiments, for example, control registers 203 may include a memory encryption capability register, a memory encryption activation register, and/or one or more memory encryption exclusion registers, as described further below.

In certain embodiments, a memory encryption capability register (ME_CAPABILITY_MSR) may be used to allow software to discover the memory encryption capabilities of system 200. For example, software can read the ME_CAPABILITY_MSR (e.g., using a read MSR (RDMSR) instruction) to identify the supported encryption types and/or algorithms, the maximum number of encryption keys that can be used concurrently, and so forth. TABLE 1 illustrates an exemplary embodiment of the memory encryption capability register (ME_CAPABILITY_MSR).

TABLE 1

Memory Encryption Capability Register (ME_CAPABILITY_MSR)

| FIELD | BIT INDEX | DESCRIPTION |
|---|---|---|
| SUPPORTED ENCRYPTION ALGORITHMS | 0:15 | This field is used to identify supported encryption algorithms or encryption types. Each bit of this field (if used) corresponds to a particular encryption algorithm. For example, bit 0 may correspond to AES-XTS 128-bit encryption, bit 1 may correspond to AES-XTS 256-bit encryption, and so forth. A particular encryption algorithm is supported if the corresponding bit has a value of 1, and is unsupported if the corresponding bit has a value of 0. In certain embodiments, one or more bits of this field may each further correspond to particular encryption algorithms in conjunction with a memory integrity protection option in accordance with techniques described herein, enabling a user to selectively enable or disable memory integrity protection as well as the supported encryption algorithm. For example, continuing the example above in which bit 0 corresponds to AES-XTS 128-bit encryption and bit 1 corresponds to AES-XTS 256-bit encryption, bit 2 may further correspond to AES-XTS 128-bit encryption with memory integrity option, bit 3 may further correspond to AES-XTS 256-bit encryption with memory integrity option, etc. |
| RESERVED | 16:31 | These bits are unused and/or reserved (e.g., reserved for functionality extensions and/or other purposes). |
| MAX # OF KEY ID BITS (ME_MAX_KEYID_BITS) | 32:35 | This field is used to identify the maximum number of bits that can be used for key identifiers. More specifically, the value of this bit field represents the maximum number of higher order bits of a memory address that can be used as a key or domain identifier for memory encryption. For example, if this field has a value of 8 (binary 1000), the higher order 8 bits of a memory address can be used as a key identifier, thus supporting a total of 256 keys ($2^8$ = 256). Since this is a four-bit field, the maximum value is 15 (binary 1111), which allows support for up to tv32k keys ($2^{15}$ = 32,768). The value of this field is 0 if multi-key memory encryption is not supported. |
| MAX # OF KEYS (ME_MAX_KEYS) | 36:50 | The value of this field represents the maximum number of encryption keys that can be used for memory encryption. This field can be used to specify a maximum number of keys that is less than the total number of supported keys (as specified by the ME_MAX_KEYID_BITS field above (bits 32:35)). For example, if the above ME_MAX_KEYID_BITS field has a value of 8, the total number of supported keys is 256 ($2^8$ = 256). However, if the present field (ME_MAX_KEYS) has a value of 200, then only 200 keys of the 256 total supported keys can be used. The value of this field is 0 if multi-key memory encryption is not supported. |
| RESERVED | 51:63 | These bits are unused and/or reserved (e.g., reserved for functionality extensions and/or other purposes). |

The memory encryption activation register (ME_ACTI-VATE_MSR) may be used to activate the cryptographic memory protection of system 200 (e.g., by setting the appropriate values in the register fields). TABLE 2 illustrates an exemplary embodiment of the memory encryption activation register (ME_ACTIVATE_MSR).

TABLE 2

Memory Encryption Activation Register (ME_ACTIVATE_MSR)

| FIELD | BIT INDEX | DESCRIPTION |
| --- | --- | --- |
| READ-ONLY LOCK | 0 | This field is used to activate a read-only lock on the memory encryption configuration registers after memory encryption has been activated. For example, the lock may be activated after memory encryption has been activated through a write to the ME_ACTIVATE_MSR register (e.g., using a write MSR or WRMSR instruction). The lock can be enabled by setting this bit field to 1, and the lock can be disabled by setting this bit field to 0. The lock is applied to the ME_ACTIVATE_MSR, ME_EXCLUDE_BASE_MSR, and ME_EXCLUDE_MASK_MSR registers. Any writes to these registers will be ignored while the lock is active. The lock is reset when the processor is reset. |
| ENABLE MEMORY ENCRYPTION | 1 | This field is used to enable or disable memory encryption. Memory encryption is enabled when this bit field has a value of 1, and is disabled when this bit field has a value of 0. |
| KEY SELECTION FOR DEFAULT MODE | 2 | This field is used to select a key to be used for default encryption mode. Memory regions protected using default encryption mode, for example, are protected uniformly using a default encryption algorithm and key. If this bit field is set to 0, a new key is created (e.g., after a cold or warm boot). If this bit field is set to 1, an existing key is restored from storage (e.g., after resuming from standby). |
| SAVE KEY FOR STANDBY | 3 | This field is used to specify whether the key used for default encryption mode should be saved in order to allow the key to be restored after resuming from standby. If this bit field is set to 1, the key is saved. If this bit field is set to 0, the key is not saved. |
| ENCRYPTION ALGORITHM FOR DEFAULT MODE | 4:7 | This field can be used to specify the encryption algorithm to use for default encryption mode. The value of this field identifies the bit index in the ME_CAPABILITY_MSR register that corresponds to the selected encryption algorithm. For example, the supported encryption algorithms are identified by bits 0:15 of the ME_CAPABILITY_MSR register. For example, bit index 0 of the ME_CAPABILITY_MSR register may correspond to AES-XTS 128-bit encryption, bit index 1 may correspond to AES-XTS 256-bit encryption, and so forth. If the present field has a value of 0 (binary 0000), the encryption algorithm corresponding to bit index 0 of the ME_CAPABILITY_MSR register is selected, which would be AES-XTS 128-bit encryption. If the present field has a value of 1 (binary 0001), the encryption algorithm corresponding to bit index 1 of the ME_CAPABILITY_MSR register is selected, which would be AES-XTS 256-bit encryption. |
| RESERVED | 8:31 | These bits are unused and/or reserved (e.g., reserved for functionality extensions and/or other purposes). |
| # OF KEY ID BITS (ME_KEYID_BITS) | 32:35 | This field is used to identify the number of bits that are used for key identifiers. More specifically, the value of this field represents the number of higher order bits of a memory address that are used as a key or domain identifier for memory encryption. This field can be used to specify a number of bits for key identifiers that is less than the maximum number of available bits for key identifiers (as specified by the ME_MAX_KEYID_BITS field (bits 32:35) of the ME_CAPABILITY_MSR register). For example, if the present field has a value of 8 (binary 1000), the higher order 8 bits of a memory address are used as the key identifier, thus |

TABLE 2-continued

| | Memory Encryption Activation Register (ME_ACTIVATE_MSR) | |
|---|---|---|
| FIELD | BIT INDEX | DESCRIPTION |
| | | supporting a total of 256 keys ($2^8 = 256$). The value of this field is 0 if multi-key memory encryption is disabled. If multi-key memory encryption is disabled, but memory encryption in general is enabled (e.g., bit 1 of ME_ACTIVATE_MSR is set), then only default encryption mode is enabled (and custom or multi-key encryption is disabled). |
| RESERVED | 36:47 | These bits are unused and/or reserved (e.g., reserved for functionality extensions and/or other purposes). |
| ENCRYPTION RESTRICTION BITMASK | 48:63 | This field can be used to restrict the encryption algorithms that can be used for multi-key encryption. For example, the supported encryption algorithms are identified in the ME_CAPABILITY_MSR register (bits 0:15). The bits in the present field correspond to the bits of the ME_CAPABILITY_MSR register that are used to identify the supported encryption algorithms. In this manner, a supported encryption algorithm can be restricted from being used for multi-key encryption by clearing the corresponding bit in the present field (or alternatively, setting the corresponding bit). |

The memory encryption exclusion registers (ME_EXCLUDE_BASE_MSR and ME_EXCLUDE_MASK_MSR) may be used to exclude certain memory regions from the cryptographic memory protection provided by system 200. For example, in some embodiments, the exclusion registers may be used to identify a base memory address, and memory encryption may then be bypassed for memory addresses matching the base address (e.g., allowing the excluded or bypassed memory addresses to be accessed in plaintext mode).

TABLE 3 illustrates an example embodiment of the memory encryption exclusion mask register (ME_EXCLUDE_MASK_MSR), and TABLE 4 illustrates an example embodiment of the memory encryption exclusion base register (ME_EXCLUDE_BASE_MSR).

TABLE 3

| | Memory Encryption Exclusion Mask Register (ME_EXCLUDE_MASK_MSR) | |
|---|---|---|
| FIELD | BIT INDEX | DESCRIPTION |
| RESERVED | 0:10 | These bits are unused and/or reserved (e.g., reserved for functionality extensions and/or other purposes). |
| ENABLE EXCLUSION | 11 | This field can be used to enable or disable exclusions from memory encryption protection. When this field is set to 0, no memory addresses are excluded from memory encryption protection. When this field is set to 1, the ME_EXCLUDE_MASK_MSR and ME_EXCLUDE_BASE_MSR registers are used to define a memory range that is excluded from memory encryption protection. |
| EXCLUSION MASK | 12:(MAX ADDRESS SIZE-1) | This field is used to identify the bits of a memory address that must match the EXCLUSION BASE (defined in the ME EXCLUDE BASE MSR register) in order to qualify as an excluded memory range. For example, when accessing a particular memory address, the memory address can be AND-ed with the EXCLUSION MASK, and if the result matches the EXCLUSION BASE, memory encryption is bypassed for that memory address. |
| RESERVED | (MAX ADDRESS SIZE):63 | These bits are unused and/or reserved (e.g., reserved for functionality extensions and/or other purposes). |

TABLE 4

Memory Encryption Exclusion Base Register (ME_EXCLUDE_BASE_MSR)

| FIELD | BIT INDEX | DESCRIPTION |
|---|---|---|
| RESERVED | 0:11 | These bits are unused and/or reserved (e.g., reserved for functionality extensions and/or other purposes). |
| EXCLUSION BASE | 12:(MAX ADDRESS SIZE-1) | This field is used to identify the base memory address of a particular memory range to exclude from memory encryption protection. |
| RESERVED | (MAX ADDRESS SIZE):63 | These bits are unused and/or reserved (e.g., reserved for functionality extensions and/or other purposes). |

In the illustrated embodiment, memory protection controller 206 maintains an internal domain key table 207 to identify protected domains that have been configured in system 200. The key table 207 may be implemented using any form of memory or storage (e.g., RAM), and may also be implemented directly on memory protection controller 206, in memory 210, and/or using another memory component.

The entries 207a-d of domain key table 207 each correspond to a different protected domain. For example, each entry 207a-d includes a key or domain identifier (ID), a protection mode, and an associated encryption key (if applicable). In some embodiments, for example, a key ID may represent the higher order bits of the memory addresses that are within the associated protected domain. For example, as discussed above, the ME_KEYID_BITS field of the ME_ACTIVATE_MSR register specifies the number of bits used for key IDs. In the illustrated example, each key ID in domain key table 207 is represented using 5 bits. Accordingly, the protected domain associated with a given key ID covers all memory addresses whose highest order 5 bits match the key ID. In the illustrated embodiment, the key ID is stored as a field in key table 207, but in alternative embodiments, the key ID may be used as an index into key table 207 rather than being stored directly in key table 207.

Moreover, in some embodiments, multiple protection modes may be supported, and each protected domain may be protected using a particular protection mode. For example, in some embodiments, the supported protection modes may include plaintext mode (e.g., unencrypted), standard or default encryption mode (e.g., encrypted using a standard or default encryption key), and/or custom encryption mode (e.g., encrypted using a unique encryption key). Accordingly, key table 207 may identify the protection mode associated with each protected domain or key ID.

For example, in the illustrated example, domain key table 207 includes four entries. The first entry identifies a protected domain corresponding to key ID 00000 (thus covering all memory addresses that contain 00000 in the highest order 5 bits), which is protected in default encryption mode using key "ABC." The second entry identifies a protected domain corresponding to key ID 00001 (thus covering all memory addresses that contain 00001 in the highest order 5 bits), which is protected in plaintext mode and thus does not have an associated encryption key. The third entry identifies a protected domain corresponding to key ID 00010 (thus covering all memory addresses that contain 00010 in the highest order 5 bits), which is protected in custom encryption mode using key "XYZ." The fourth entry identifies a protected domain corresponding to key ID 00011 (thus covering all memory addresses that contain 00011 in the highest order 5 bits), which is protected in default encryption mode using key "ABC." As shown by these examples, the domain protected using custom encryption mode has a unique key ("XYZ"), the domains protected using default encryption mode share an encryption key ("ABC"), and the domain protected in plaintext mode is unencrypted and thus has no associated key.

Figure 3:
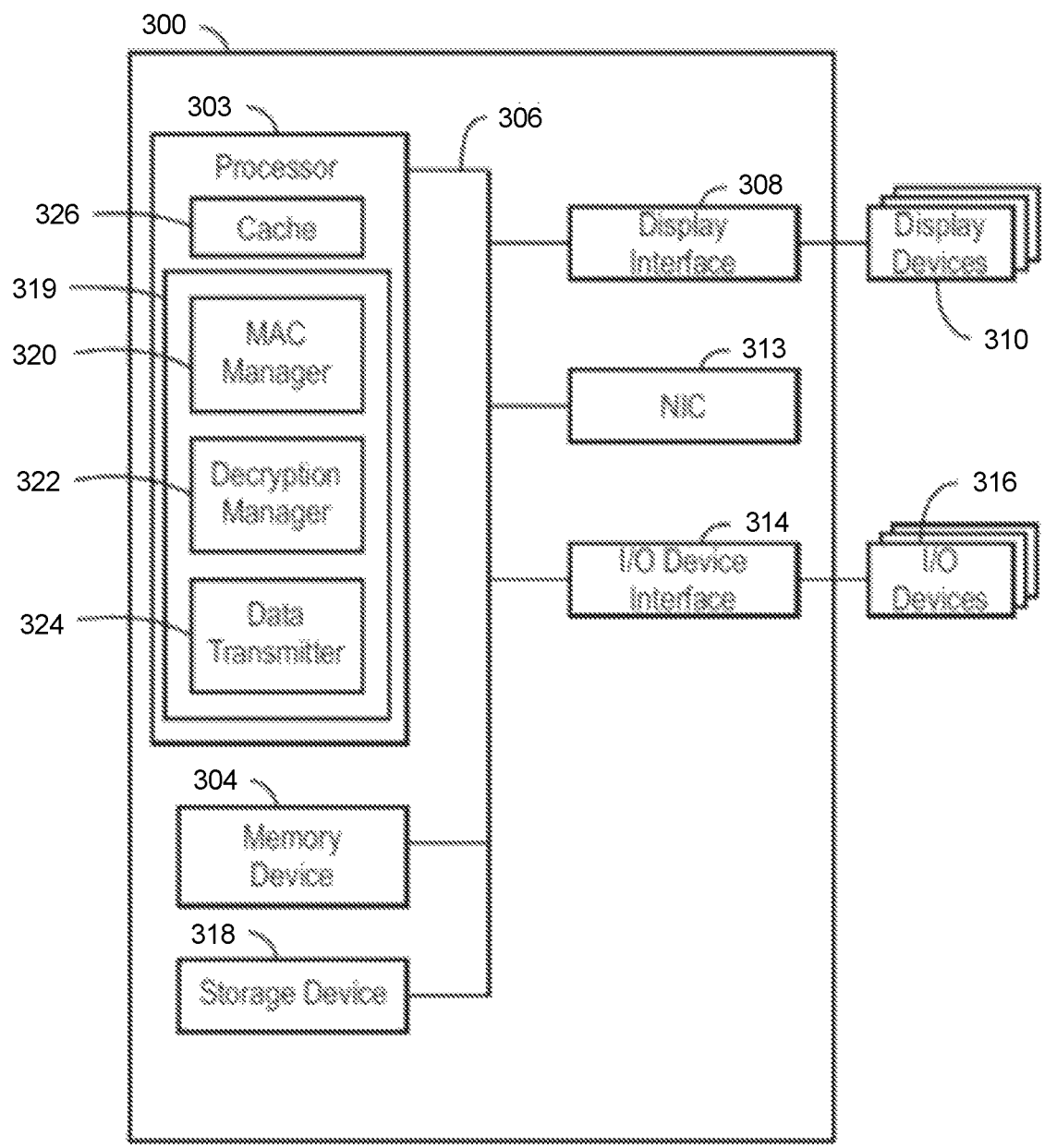
FIG. 3 is a block diagram of an exemplary host computing device suitable for performing operations in accordance with at least some of the techniques described herein.

FIG. 3 is a block diagram of an exemplary host computing device 300 suitable for performing operations in accordance with at least some of the techniques described herein. The host computing device 300 may be, for example, a mobile phone, laptop computer, desktop computer, or tablet computer, among others. The host computing device 300 may include processing circuitry, such as a processor 302, that is adapted to execute stored instructions. The host computing device 300 may further include memory circuitry, such as memory device 304, to store instructions that are executable by the processor 302. One or more techniques described herein may be performed via such instructions executed by the processor 302, with such instructions comprising, in various embodiments, program code and/or microcode configured to cause the processor 302 to perform activities related to reading data, writing data, processing data, formulating data, converting data, transforming data, etc. The processor 302 may be a single core processor, a multi-core processor, a computing cluster, or any number of other configurations. Exemplary processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. The memory device 304 may comprise random access memory (RAM) and/or read-only memory (ROM) in a fixed or removable format. Memory comprising RAM may include volatile memory configured to hold information during the operation of host computing device 300 such as, for example, static RAM (SRAM) or Dynamic RAM (DRAM). Memory comprising ROM may include non-volatile (NV) memory circuitry configured based on BIOS, UEFI, etc. to provide instructions when host computing device 300 is activated, programmable memories such as electronic programmable ROMs (EPROMS), Flash, etc.

The processor 302 may also be linked through the system interconnect or "bus" 306 (e.g., PCI®, PCI-Express®, NuBus, etc.) to a display interface 308 adapted to connect the host computing device 300 to a display device 310. In certain embodiments, the display device 310 may include a display screen that is housed within the host computing device 300. In other embodiments, the display device 310 may include a computer monitor, television, or projector, among others, such as may be externally connected to the host computing device 300. The display device 310 may include one or more light-emitting diodes (LEDs), micro-LEDs, and/or other suitable display elements.

In the depicted embodiment, a network interface controller (also referred to herein as a NIC) 312 is communicatively coupled to the host computing device 300 via the system interconnect 306 to one or more computing networks (not shown), such as the network 150 of FIG. 1.

Also in the depicted embodiment, processor 302 is communicatively coupled via system interconnect 306 to an input/output (I/O) device interface 314 adapted to connect the computing host device 300 to one or more I/O devices 316. Such I/O devices 316 may include, for example, hardware and/or software to allow users to interact with host computing device 300 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). In various embodiments, I/O devices 316 may include built-in components of the host computing device 300, and/or devices that are externally connected to the host computing device 300.

In some embodiments, the processor 302 may also be linked through the system interconnect 306 to any storage device 318 that may include a hard drive, an optical drive, a USB flash drive, Solid State Drive (SSD) or other non-volatile storage medium, an array of drives, or any combinations thereof. In some embodiments, the storage device 318 may include any suitable applications and stored data.

In certain embodiments, the processor 302 may include any suitable number of logic modules executable by a memory controller 319. In some examples, the memory controller 319 (or Memory Management Unit) is logic on the processor 302 that interacts with the external system memory device 304. The memory controller 319 may interact with the external memory 304 for read/write operations, to transmit or receive data, to generate/manage the MACs, error correction codes, encryption/decryption, and the like. In certain embodiments and scenarios, a MAC manager 320 may be to store a first MAC based on data stored in system memory in response to a write operation to the system memory, and may further be to detect a read operation corresponding to the data stored in the system memory and generate a second MAC based on the data stored in the system memory. The MAC manager 320 may also determine that the second MAC does not match the first MAC and recalculate the second MAC. Furthermore, a decryption manager 322 may decrypt the data stored in the system memory in response to detecting that the recalculated second MAC matches the first MAC. In some embodiments, a data transmitter 324 may transmit the decrypted data to cache 326 residing on a processor 302, or any other suitable cache or memory device. In some examples, the cache 326 (or cache hierarchy) may be interposed or otherwise located between the processor 302 and memory controller 319. In some embodiments, the processor 302, cache 326, and memory controller 319 may be incorporated within a single SOC (system on chip), or otherwise located on the same physical chip/die or package.

Consistent with the present disclosure, the host computing device 300 may comprise additional hardware configured to transport and process data, including but not limited to memory map data, configuration register data, and other data. Non-exclusive examples of such hardware may include discrete analog and/or digital components (e.g., arranged on a printed circuit board (PCB) to form circuitry), at least one integrated circuit (IC), at least one group or set of ICs that may be configured to operate cooperatively (e.g., chipset), a group of IC functionality fabricated on one substrate (SoC), or combinations thereof. In at least one exemplary embodiment, portions of host computing device 300 may be composed of software (e.g., instructions, data, etc.) that, when loaded into the memory device 304, may cause the processor 302 to transform from general purpose processing circuitry into specialized circuitry configured to perform certain functions based on such software.

It is to be understood that the block diagram of FIG. 3 is not intended to indicate that the host computing device 300 is to include all of the components shown in FIG. 3. Rather, the host computing device 300 may include fewer or additional components not illustrated in FIG. 3 (e.g., additional memory components, embedded controllers, additional modules, additional network interfaces, etc.). Furthermore, any of the functionalities of the MAC manager 320, decryption manager 322, and data transmitter 324 may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the MAC manager 320, decryption manager 322, and data transmitter 324 may be implemented with logic, wherein the logic, as referred to herein, may include any suitable hardware (e.g., a processor, among others), software (e.g., an application, among others), firmware, or any suitable combination of hardware, software, and firmware.

Figure 4:
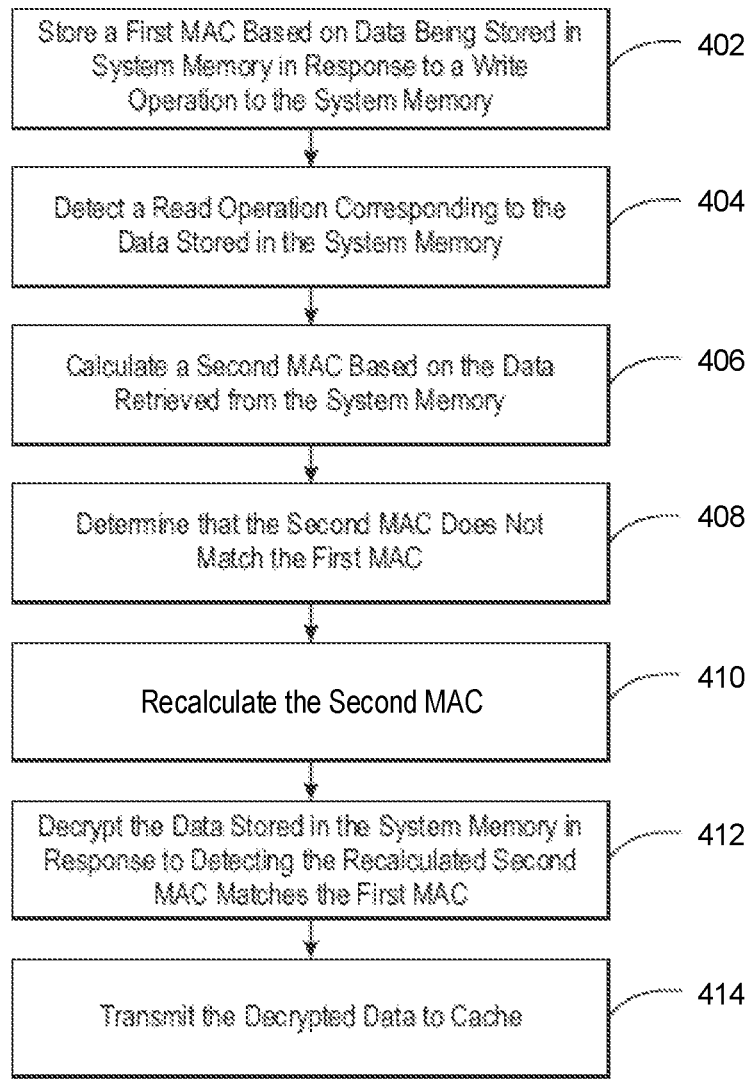
FIG. 4 illustrates an exemplary process flow for managing encrypted data in accordance with at least some of the techniques presented herein.

FIG. 4 illustrates an exemplary process flow for managing encrypted data. The method 400 illustrated in FIG. 4 may be implemented with any suitable computing component or device, such as the computing device 300 of FIG. 3. While the exemplary MAC manager 320 of FIG. 3 will be utilized in the following example, it will be appreciated that in various embodiments other components may perform some or all of the functionality described below with respect to the method 400. As one non-limiting example, various operations described with respect to FIG. 4 may in certain embodiments be performed by a memory controller (such as memory controller 208 of FIG. 2).

At block 402, MAC manager 320 may generate and/or store a first MAC based on data being stored in system memory in response to a write operation to the system memory. For example, the MAC manager 320 may detect a write operation to system memory and use any suitable cryptographic MAC function with a second key, among others, to generate a MAC value based on the data stored in memory. In some embodiments, the data stored in memory may include any suitable cipher text that is encrypted with any suitable encryption technique. The result of the logical operation across blocks of device data may be stored as a device data block correction value.

At block 404, the MAC manager 320 may detect a read operation corresponding to the data stored in the system memory. For example, the MAC manager 320 may detect an attempt to execute an instruction based on the encrypted data stored in system memory.

At block 406, the MAC manager 320 may calculate a second MAC based on the encrypted data retrieved from the system memory. The MAC manager 320 may apply the same MAC function used on the write operation, as well as use the same key, in order to produce a matching MAC.

At block 408, the MAC manager 320 may determine that the second MAC does not match the first MAC. For example, the MAC manager 320 may detect if bits of data stored in memory have flipped since the data was stored in memory as part of a write operation. In some examples, the flipped bits in memory may represent data corrupted by a malicious attempt to manipulate the data stored in memory.

At block 410, the MAC manager 320 may recalculate the second MAC, such as based on a keyed secure hash operation of device data blocks 1-4. The replacement value should then be used instead of the erroneous device data block.

At block 412, the decryption manager 122 may decrypt the data stored in the system memory in response to detecting the recalculated second MAC matches the first MAC. At block 414, the data transmitter 124 may transmit the decrypted data to cache.

The process flow diagram of FIG. 4 is not intended to indicate that the operations of the method 400 are to be executed in any particular order in all embodiments, or that all of the operations of the method 400 are to be included in every case. Additionally, the method 400 may include any suitable number of additional operations. For example, the techniques herein may be applied to correct a block or integrated circuit of any suitable size.

As discussed in greater detail elsewhere herein, in at least some embodiments an exemplary MAC may be generated by a memory controller, MAC manager, or other suitable component as part of a write operation when a data line is written to memory, as part of a read operation when a data line is read from memory, and/or for some other architecturally suitable operation. Such operations may be initiated or otherwise performed, for example, as part of a processor executing one or more instructions. In certain embodiments, such an exemplary MAC may be generated according to the following specification:

$$MAC=MAC\_ALG(CTDATA,PA\_CTDATA, KEY_{VM})$$

such that MAC_ALG is the algorithm used to generate the MAC, and such that the parameters indicated for such generation include:

CTDATA: Ciphertext data that will be encrypted and stored in a memory data line;

PA_CTDATA: Host physical address of the ciphertext data line; and $KEY_{VM}$: the MAC Key associated with (and specific to) the virtual machine to which the data line belongs.

Non-exclusive examples of appropriate cryptographic MAC_ALG algorithms include NIST-approved algorithms (such as the SHA-3, SHA-1, SHA-2, and MD5 algorithms), although it will be appreciated that other cryptographic algorithms may be used.

In certain embodiments, a MAC construction in accordance with the techniques described herein may increase protection against various types of attacks. As non-limiting examples, such attacks may include spoofing (in which an attacker is able to modify a cache line in memory or over the memory bus); splicing (in which an attacker is able to swap cache lines between different physical locations); and cross-domain attacks (in which an attacker is able to record ciphertext and/or a corresponding MAC of one user or VM and validly utilize it for another user or VM at a later time). In particular, the provided MAC construction may grant protection against spoofing (where an attacker directly tries to modify bits of data in memory) by including the data as a component of the MAC. Moreover, the physical address included in the MAC construction ensures that an attacker is prevented from swapping different blocks in memory (along with the associated MAC) without detection, thereby protecting against splicing or relocation attacks. In addition, by incorporating the key associated with the virtual machine to which the data line belongs, the provided MAC construction offers protection against cross-domain attacks.

As noted elsewhere herein, in at least certain embodiments, a separate MAC key—which is different from the encryption key—may be associated with each VM in a virtualization scenario. For example, consider a cacheline at a first physical memory address (PA1) at time t1 that is mapped to a first virtual machine VM1, with PA1 being encrypted using key K1. At a later time t2, PA1 may be mapped to a second virtual machine VM2 using a distinct other key K2. Under such circumstances, an attacker may attempt to cause cross-domain injection by injecting PA1 contents belonging to VM1 to VM2 as follows:

Record PA1 data and corresponding MAC at time t1, when PA1 is mapped to VM1;

At time t2, when PA1 is mapped to VM2, the attacker modifies PA1 to include the contents recorded in the previous step, and substitutes the MAC that was associated with PA1 at time t1.

VM2 reads the data line at PA1.

It will be appreciated that although the data at PA1 will be decrypted using key K2 associated with VM2 and hence decrypt to garbage values, the integrity checks will pass if the MAC is computed based on the ciphertext alone. However, by incorporating the MAC key associated with the VM, the exemplary MAC construction described above defends against the described cross-domain attack, as the MAC used from time t1 would be generated with the key K1 associated with VM1—and therefore fail verification when PA1 is mapped to VM2, as the key associated with VM2 (i.e., K2) would be used to verify the MAC instead.

As noted elsewhere herein, in certain embodiments a MAC may be transmitted in a low-overhead manner by embedding the MAC utilizing ancillary bits (such as ECC bits or other bits transmitted with data on the memory bus rather than requiring a separate fetch from additional storage) without incurring the operational overhead associated with a separate fetch from memory. As one non-limiting example, certain server platforms implement various "reliability, availability and serviceability" (RAS) features and performance optimizations which require bits travelling over the memory bus with the data line. Such bits may be repurposed to include an embedded MAC. Moreover, also as described elsewhere herein, in various embodiments one or more users may be enabled to explicitly "opt in" to such techniques (such as by setting configuration bits within the Memory Encryption Activation Register (ME_ACTIVATE_MSR) described with respect to TABLE 2), such as if the utilization of such ancillary bits for secure MAC transmission is deemed less desirable than other features for which such ancillary bits may be utilized.

Additional details are now provided with respect to operations that in certain embodiments may be performed in the event of a detected memory integrity failure, such as if an integrity check performed in accordance with the techniques described elsewhere herein fails. In particular, operational details are described below with respect to trust domain (TD) architecture, such as is used to provide processing and storage isolation in virtualized systems.

In various implementations, a TD architecture and instruction set architecture (ISA) extensions (referred to herein as TD extensions (TDX)) for the TD architecture are utilized to provide confidentiality and integrity for user/tenant software executing in multi-user infrastructure. The TD architecture, which may be a System-on-Chip (SoC) capability, provides isolation between TD workloads and CSP software, such as a virtual machine manager (VMM) of the multi-user infrastructure. In certain embodiments, components of the TD architecture may include 1) memory encryption via a MKTME engine; 2) a resource management capability referred to herein as the trust domain resource manager (TDRM), which in certain implementations may operate as a software extension of the (VMM); and 3) execution state and memory isolation capabilities in the processor provided via a CPU-managed Memory Ownership Table (MOT) and via CPU access-controlled TD control structures. The TD architecture provides an ability of a processor to deploy user-specific TDs that leverage the MKTME engine, the MOT, and the access-controlled TD control structures for secure operation of TD workloads.

In one implementation, user software is executed in a user-specific TD, and comprises a user workload (which may as non-limiting examples comprise an operating system (OS) alone along with other ring-3 applications running on top of the OS, and/or a virtual machine (VM) running on top of a VMM along with other ring-3 applications). Each TD operates independently of other TDs in the system and uses logical processor(s), memory, and I/O assigned by the TDRM on the platform. Each TD is cryptographically isolated in memory using at least one exclusive encryption key of the MKTME engine for encrypting the memory (which may hold code and/or data) associated with the particular TD.

In at least some embodiments, the TDRM operates as a host for the multiple TDs and has full control of the processing cores and other platform hardware. A TDRM assigns software in a TD with logical processor(s), but may be unable to access a TD's execution state on those assigned logical processor(s). Similarly, a TDRM assigns physical memory and I/O resources to the TDs, but is not privy to access the memory state of a TD due to the use of separate encryption keys enforced by the CPUs per TD, and other integrity and replay controls on memory. Software executing in a TD operates with reduced privileges, such that the TDRM may retain control of platform resources. However the TDRM is typically unable to affect the confidentiality or integrity of the TD state in memory or in the CPU structures under defined circumstances. Moreover, the TD architecture supports a software stack consisting of multiple VMMs (e.g., using virtual machine extensions or "VMX"), OSes, and/or application software hosted by one or more OSes. Each TD operates independently of others within the virtualized system.

Figures 5A, 5B:
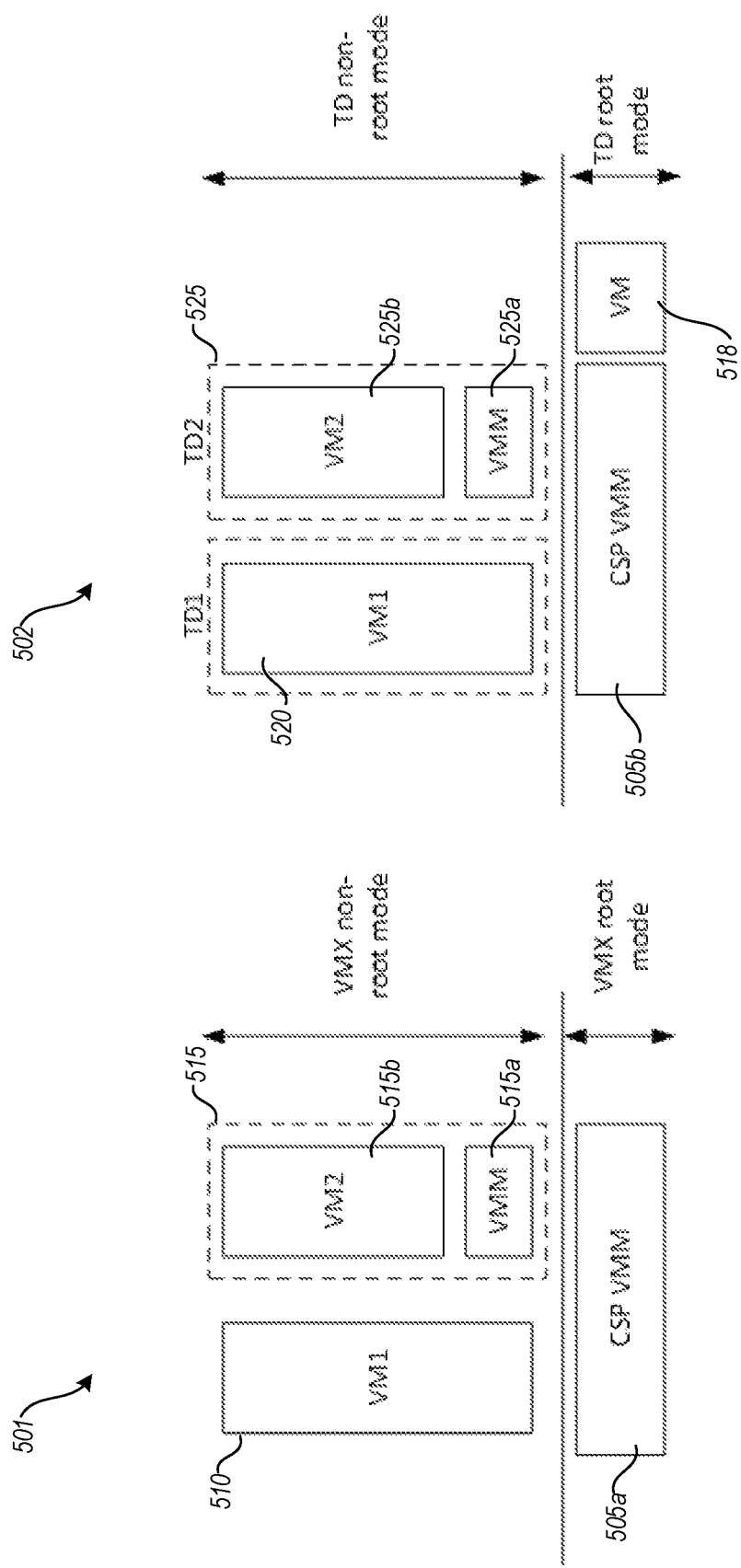
FIGS. 5A-5B depict block diagrams illustrating aspects of exemplary computing systems that each implement a trust domain architecture in accordance with at least some of the techniques presented herein.

FIG. 5A is a block diagram depicting aspects of an exemplary computing system implementing a VM architecture 501 operating without TD extension (TDX) functionality. The VM architecture 501 includes a CSP VMM 505a running in "VMX root mode." The VM architecture 501 includes a first virtual machine (VM1) 510 running in "VMX non-root mode," and also includes a nested virtual machine 515 similarly running in VMX non-root mode; the nested virtual machine includes a non-root VMM 515a and an associated non-root virtual machine (VM2) 515b.

FIG. 5B is a block diagram depicting aspects of a contrasting exemplary computing system implementing a TD architecture 502. In particular, and in notable contrast to the VM architecture 501 of FIG. 5A, TD architecture 502 is operating with TDX functionality available, such that a CSP VMM 505b (along with a CSP VM 518) is operating in "TD root mode," such that the CSP VMM 505b continues to manage hosted non-root mode VMs, but is external to the TCB of such hosted non-root mode VMs (and any associated user workloads). It will be appreciated that while the exemplary embodiment depicted in FIG. 5A utilizes TDX, the techniques described herein with respect to that embodiment may be leveraged by any isolation architecture. The TD architecture 502 includes first virtual machine 520 executing within a first TD (TD1), as well as a nested VM 525 (comprising VMM 525a and VM 525b) executing within a second TD (TD2). The hosted customer workloads or VMs hosted run in TD non-root mode.

Figure 6:
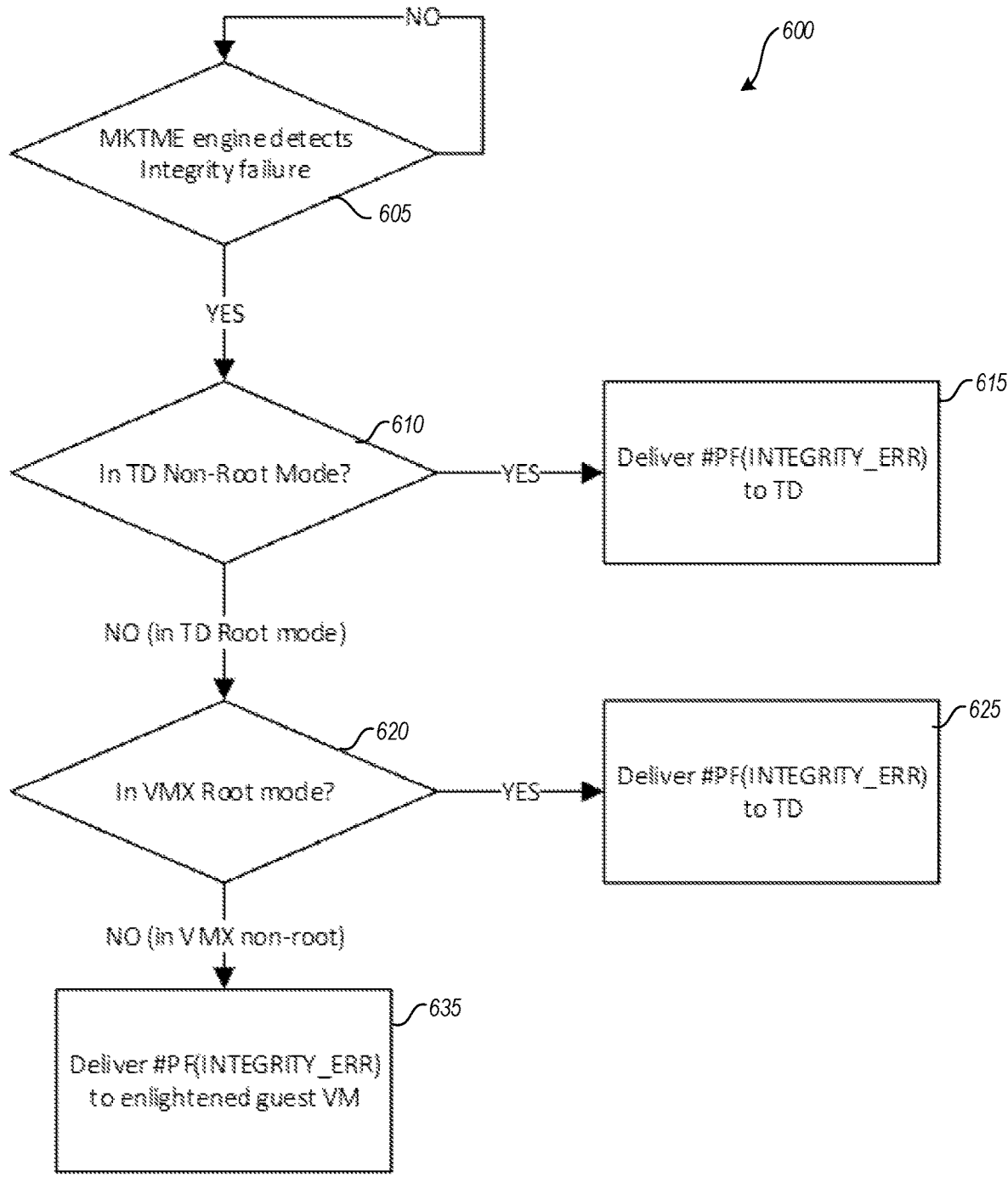
FIG. 6 depicts an exemplary execution flow for handling memory integrity errors via one or more trust domain architectures in accordance with at least some of the techniques presented herein.

FIG. 6 depicts an exemplary execution flow 600 for handling memory integrity errors in accordance with TD architectures described elsewhere herein, such as one or more of the exemplary TD architectures of FIGS. 5A-5B. In particular, in block 605 the MKTME engine detects an integrity failure, and signals a corresponding interrupt to a processor that originated the request associated with the detected integrity error. On receiving the interrupt, in block 610 the processor determines whether the logical processor associated with the error-causing request is executing in TD non-root mode. If so, then in block 615 the logical processor delivers a page fault error code indicating the detected integrity error to the TD currently executing on the logical processor. If, on the other hand, it is determined in block 610 that the processor is in TD root mode, the execution flow proceeds to block 620 to determine whether the logical processor is executing in VMX root mode. If so, then in block 625, the page fault error code is directed to the TD executing on the logical processor. If in block 620 it was determined that the logical processor is not operating in VMX root mode (and therefore is in VMX non-root mode), the page fault error code is delivered to the relevant guest VM. In certain embodiments, the page fault error code delivered to a relevant guest VM may be handled by the VMM in TD root mode, such as if the VM is not enlightened. In this manner, trusted software is in control of its destiny. Integrity errors received in TD non-root mode and by the VMM code or data running in TD root-mode can directly impact the TD security/operation and hence are re-directed to the TD. On the other hand, integrity errors received in VMX non-root mode in TD root mode can safely be handled by the guest VM whose data or code is corrupted since it does not impact the security of the TDs executing on top of the CSP VMM.

In this manner, TD software receiving the page fault error code may determine an appropriate course of action. As a non-limiting example, the TD may determine to stop executing and notify the owning user of the detected error to decide on one or more further courses of action. It will be appreciated that in past operations for various VM architectures, a VMM may cause an exit on non-maskable interrupts (NMIs) and exceptions such as the described page fault error code, which the VMM may determine to suppress and never deliver to the VM. Notably with the techniques described herein, such an NMI generated by the MKTME engine in case of integrity failures and the corresponding page fault error code delivered to a guest VM may be unable to be masked or cause an exit to the VMM. This approach may ensure trusted delivery of an indication of the integrity failure to the relevant trusted software.

While figures of the present disclosure illustrate and/or describe operations according to particular embodiments in accordance with techniques described herein, it is to be understood that not all such operations are necessary for other embodiments. Indeed, it is fully contemplated herein that in other embodiments of the present disclosure, the operations illustrated and/or otherwise described herein may be combined in a manner not specifically shown in any of those drawings, but still fully consistent with the present disclosure. Thus, claims directed to features and/or operations that are not exactly shown in one drawing are deemed within the scope and content of the present disclosure.

In general, devices described herein may comprise various physical and/or logical components for communicating information which may be implemented as hardware, software, or any combination thereof, as desired for a given set of design parameters or performance constraints. Although the accompanying figures and corresponding text may depict or describe a limited number of components by way of example, it will be appreciated that a greater or a fewer number of components may be employed for a given implementation.

In various embodiments, a device described herein described herein may be implemented for a PC, CE, and/or mobile platform as a system within and/or connected to a device such as personal computer (PC), set-top box (STB), television (TV) device, Internet Protocol TV (IPTV) device, media player, and/or smart phone. Other examples of such devices may include, without limitation, a workstation, terminal, server, media appliance, audio/video (A/V) receiver, digital music player, entertainment system; digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a digital camera, a gaming console, display device, notebook PC, a laptop computer, portable computer, hand-held computer, personal digital assistant (PDA), voice over IP (VoIP) device, cellular telephone, combination cellular telephone/PDA, pager, messaging device, wireless access point (AP), wireless client device, wireless station (STA), base station (BS), subscriber station (SS), mobile subscriber center (MSC), mobile unit, and so forth.

In various embodiments, a device described herein may form part of a wired communications system, a wireless communications system, or a combination of both. For example, such a device may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Such a device also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

In various embodiments, a device described herein may be arranged to operate within a network, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system," "component," or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical discs, compact disc read-only memories (CD-ROMs), compact disc rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to providing low-overhead cryptographic memory isolation to mitigate attack vulnerabilities in a multi-user virtualized computing environment. Memory read and memory write operations for target data, each initiated via an instruction associated with a particular virtual machine (VM), include the generation and/or validation of a message authentication code that is based at least on a VM-specific cryptographic key and a physical memory address of the target data. Such operations may further include transmitting the generated message authentication code via a plurality of ancillary bits incorporated within a data line that includes the target data. In the event of a validation failure, one or more error codes may be generated and provided to distinct trust domain architecture entities based on an operating mode of the associated virtual machine.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for secure display of protected content.

According to example 1 there is provided a system for cryptographic memory isolation. The system may comprise processing circuitry to execute each of a plurality of instructions, wherein each instruction is associated with one virtual machine (VM) of multiple virtual machines (VMs). The system may further comprise memory circuitry communicatively coupled to the processing circuitry and comprising a memory controller to perform at least write operations via the memory circuitry. To perform a write operation may include to generate a message authentication code (MAC). The MAC may be associated with target data to be stored via the write operation, and may be based at least in part on (a) a VM-specific cryptographic key and (b) a physical memory address in which the target data is stored via the write operation.

Example 2 may include the elements of example 1, wherein the memory controller is to generate the MAC via one or more cryptographic algorithms, wherein a distinct other cryptographic key is used to encrypt the target data, and wherein the MAC is further based on the encrypted target data.

Example 3 may include the elements of any of examples 1-2, wherein the VM-specific cryptographic key is specific to a VM associated with a first instruction of the plurality of instructions, and wherein the first instruction caused the processing circuitry to initiate the write operation.

Example 4 may include the elements of any of examples of 1-3, wherein the memory controller is further to perform read operations via the memory circuitry, wherein to perform a read operation includes to generate a second MAC for use in a validation of target data previously stored via one of the write operations, and wherein the second MAC is based at least in part on a second VM-specific cryptographic key associated with a second instruction that caused the processing circuitry to initiate the read operation.

Example 5 may include the elements of example 4, wherein the memory circuitry is further to provide, responsive to a determination that the validation of the previously stored target data has failed, an indication to the processing circuitry that the validation has failed; and wherein the processing circuitry is further to determine an operating mode of a VM associated with the second instruction, to generate an error code responsive to the indication from the memory circuitry, and to provide the generated error code to a destination that is based on the determined operating mode of the associated VM.

Example 6 may include the elements of any of examples 4-5, wherein the generated error code is a page fault code, and wherein the determined operating mode of the associated VM is one of a group that includes a TD non-root mode, a TD root mode, a VM extension (VMX) root mode, and a VMX non-root mode.

Example 7 may include the elements of any of examples 1-6, wherein to perform a write operation further includes to store additional information comprising a plurality of secondary bits as part of a data line that includes the target data to be stored via the write operation, and wherein to store the additional information comprising the plurality of secondary bits includes embedding the generated MAC within the plurality of secondary bits as part of the data line.

Example 8 may include the elements of example 7, wherein the memory controller is further to perform read operations via the memory circuitry, and wherein to perform a read operation includes to extract the generated MAC from the data line that includes the target data.

According to example 9 there is provided an apparatus for cryptographic memory isolation. The apparatus may comprise memory circuitry perform at least write operations via the memory circuitry. To perform a write operation may include to generate a message authentication code (MAC) that is associated with target data to be stored within the memory circuitry via the write operation and that is based at least in part on (a) a cryptographic key that is specific to a virtual machine (VM) and (b) a physical memory address in which the target data is stored via the write operation.

Example 10 may include the elements of example 9, wherein to generate the MAC includes to generate the MAC via one or more cryptographic algorithms, wherein a distinct other cryptographic key is used to encrypt the target data, and wherein the MAC is further based on the encrypted target data.

Example 11 may include the elements of any of examples 9-10, wherein the VM-specific cryptographic key is specific to a VM associated with a first instruction of a plurality of instructions that are each associated with one of multiple VMs, and wherein the first instruction initiated the write operation.

Example 12 may include the elements of example 11, wherein the memory circuitry is further to perform read operations, wherein to perform a read operation includes to generate a second MAC for use in a validation of target data previously stored via one of the write operations, and wherein the second MAC is based at least in part on a second VM-specific cryptographic key associated with a second instruction that caused the processing circuitry to initiate the read operation.

Example 13 may include the elements of any of examples 11-12, wherein the memory circuitry is further to provide, responsive to a determination that the validation of the previously stored target data has failed, an indication that the validation of the target data has failed; and wherein the apparatus further comprises processing circuitry to determine an operating mode of a VM associated with the second instruction, to generate an error code responsive to the indication from the memory circuitry, and to provide the generated error code to a destination that is based on the determined operating mode of the associated VM.

Example 14 may include the elements of example 13, wherein the generated error code is a page fault code, and wherein the determined operating mode of the associated VM is one of a group that includes a TD non-root mode, a TD root mode, a VM extension (VMX) root mode, and a VMX non-root mode.

Example 15 may include the elements of any of examples of 9-14, wherein to perform a write operation further includes to store additional information comprising a plurality of secondary bits as part of a data line that includes the target data to be stored via the write operation, and wherein to store the additional information comprising the plurality of secondary bits includes embedding the generated MAC within the plurality of secondary bits as part of the data line.

Example 16 may include the elements of example 15, wherein the memory circuitry is further to perform read operations, and wherein to perform a read operation includes to extract the generated MAC from the data line that includes the target data.

According to example 17 there is provided a method for cryptographic memory isolation. The method may comprise executing each of a plurality of instructions via one or more processors, each instruction being associated with a virtual machine (VM) being executed by the one or more processors. The method may further comprise performing one or more write operations via memory circuitry communicatively coupled to the one or more processors. Each write operation may include generating, based at least in part on a VM-specific cryptographic key and on a physical memory address for the target data, a message authentication code (MAC).

Example 18 may include the elements of example 17, further comprising encrypting the target data using a distinct other cryptographic key, and wherein generating the MAC includes generating the MAC via one or more cryptographic algorithms based further in part on the encrypted target data.

Example 19 may include the elements of any of examples 17-18, wherein generating the MAC based at least in part on the VM-specific cryptographic key includes generating the MAC based on a cryptographic key that is specific to a VM associated with one instruction of the plurality of instructions, and wherein the method further comprises initiating the write operation responsive to the one instruction.

Example 20 may include the elements of any of examples 17-19, further comprising performing one or more read operations via the memory circuitry, wherein to perform a read operation includes generating a second MAC for use in validating target data previously stored via one of the write operations, wherein generating the second MAC includes generating the second MAC based at least in part on a second VM-specific cryptographic key associated with a second instruction, and wherein the method further comprises initiating the read operation responsive to the second instruction.

Example 21 may include the elements of example 20, further comprising generating, responsive to determining that the validation of the previously stored target data has failed, an error code indicating that the validation has failed; determining an operating mode of a VM associated with the second instruction; and providing the generated error code to a destination that is based on the determined operating mode of the associated VM.

Example 22 may include the elements of example 21, wherein generating the error code includes generating a page fault code, and wherein determining the operating mode of the associated VM includes determining that the operating mode is one of a group that includes a TD non-root mode, a TD root mode, a VM extension (VMX) root mode, and a VMX non-root mode.

Example 23 may include the elements of any of examples 17-22, wherein performing a write operation further includes storing additional information comprising a plurality of secondary bits as part of a data line that includes the target data, and wherein storing the additional information comprising the plurality of secondary bits includes embedding the generated MAC within the plurality of secondary bits as part of the data line.

Example 24 may include the elements of example 23, further comprising performing one or more read operations via the memory circuitry, wherein performing a read operation includes extracting the generated MAC from the data line that includes the target data.

Additional details regarding operations and techniques related to multi-key memory encryption may be found in U.S. patent application Ser. No. 15/635,548, filed on Jun. 28, 2017, which is hereby incorporated in its entirety herein. Additional information regarding operations and techniques related to trust domain architecture may be found in U.S. patent application Ser. No. 15/705,562, filed on Sep. 15, 2017, which is hereby incorporated in its entirety herein. Additional information regarding operations and techniques related to message authentication codes may be found in U.S. patent application Ser. No. 15/816,901, filed on Nov. 17, 2017, which is hereby incorporated in its entirety herein.

What is claimed:

1. A system for cryptographic memory isolation, the system comprising:
 processing circuitry to execute a plurality of instructions, wherein each instruction is associated with one virtual machine (VM) of multiple virtual machines (VMs); and
 memory circuitry communicatively coupled to the processing circuitry and comprising a memory controller to:
  perform at least write operations via the memory circuitry, wherein to perform a write operation associated with a first VM of the multiple VMs includes to:
   generate a first message authentication code (MAC) based on a combination of at least first target data to be stored via the write operation, a first cryptographic key that is specific to the first VM of the multiple VMs, and a first physical memory address in which the first target data is to be stored via the write operation;
  perform, subsequent to the write operation, a first read operation associated with the first VM of the multiple VMs, wherein to perform the first read operation includes to:

generate a second message authentication code (MAC) based on a combination of at least the first target data retrieved from the first physical memory address, the first cryptographic key that is specific to the first VM of the multiple VMs, and the first physical memory address; and determine that no integrity failure has occurred based on a comparison of the first MAC and the second MAC; and perform, subsequent to the write operation, a second read operation at the first physical memory address by a second VM of the multiple VMs, wherein to perform the second read operation includes to:

generate a third message authentication code (MAC) based on a combination of at least the first target data retrieved from the first physical memory address, a second cryptographic key that is specific to the second VM of the multiple VMs, and the first physical memory address; and detect an integrity failure based on a comparison of the first MAC and the third MAC.

2. The system of claim 1, wherein the memory controller is to generate the first MAC via one or more cryptographic algorithms, wherein a distinct other cryptographic key is used to encrypt the first target data.

3. The system of claim 1, wherein the first cryptographic key that is specific to the first VM is associated with a first instruction of the plurality of instructions, and wherein the first instruction caused the processing circuitry to initiate the write operation.

4. The system of claim 1, wherein:
the memory circuitry is further to provide, responsive to the detection of the integrity failure, an indication to the processing circuitry that the integrity failure has been detected; and the processing circuitry is further to determine an operating mode of the second VM associated with a second instruction that caused the processing circuitry to initiate the second read operation, to generate an error code responsive to the indication from the memory circuitry, and to provide the generated error code to a destination that is based on the determined operating mode of the second VM.

5. The system of claim 4, wherein the generated error code is a page fault code, and wherein the determined operating mode of the second VM is one of a group that includes a trust domain (TD) non-root mode, a TD root mode, a VM extension (VMX) root mode, and a VMX non-root mode.

6. The system of claim 1, wherein to perform the write operation further includes to store additional information comprising a plurality of secondary bits as part of a data line that includes the first target data to be stored via the write operation, and wherein the additional information comprising the plurality of secondary bits includes the first MAC.

7. The system of claim 1, wherein to perform the write operation associated with the first VM of the multiple VMs includes further to:

embed the first MAC in a data line that belongs to the first VM and that includes the first target data to be stored via the write operation.

8. An apparatus for cryptographic memory isolation, the apparatus comprising:
memory circuitry to:
perform at least write operations via the memory circuitry, wherein to perform a write operation associated with a first virtual machine (VM) of multiple virtual machines (VMs) includes to:

generate a first message authentication code (MAC) based on a combination of at least first target data to be stored within the memory circuitry via the write operation, a first cryptographic key that is specific to the first VM of the multiple VMs, and a first physical memory address in which the first target data is to be stored via the write operation;

perform, subsequent to the write operation, a first read operation associated with the first VM of the multiple VMs, wherein to perform the first read operation includes to:

generate a second message authentication code (MAC) based on a combination of at least the first target data retrieved from the first physical memory address, the first cryptographic key that is specific to the first VM of the multiple VMs, and the first physical memory address;

determine that no integrity failure has occurred based on a comparison of the first MAC and the second MAC; and perform, subsequent to the write operation, a second read operation at the first physical memory address by a second VM of the multiple VMs, wherein to perform the second read operation includes to:

generate a third message authentication code (MAC) based on a combination of at least the first target data retrieved from the first physical memory address, a second cryptographic key that is specific to the second VM of the multiple VMs, and the first physical memory address; and detect an integrity failure based on a comparison of the first MAC and the third MAC.

9. The apparatus of claim 8, wherein to generate the first MAC includes to generate the first MAC via one or more cryptographic algorithms, wherein a distinct other cryptographic key is used to encrypt the first target data.

10. The apparatus of claim 8, wherein the first cryptographic key that is specific to the first VM is associated with a first instruction of a plurality of instructions that are each associated with one of the multiple VMs, and wherein the first instruction initiated the write operation.

11. The apparatus of claim 8, wherein the memory circuitry is further to provide, responsive to the detection of the integrity failure, an indication that the integrity failure has been detected; and wherein processing circuitry is to determine an operating mode of the second VM associated with a second instruction that caused the processing circuitry to initiate the second read operation, to generate an error code responsive to the indication from the memory circuitry, and to provide the generated error code to a destination that is based on the determined operating mode of the second VM.

12. The apparatus of claim 11, wherein the generated error code is a page fault code, and wherein the determined operating mode of the second VM is one of a group that includes a trust domain (TD) non-root mode, a TD root mode, a VM extension (VMX) root mode, and a VMX non-root mode.

13. The apparatus of claim 8, wherein to perform the write operation further includes to store additional information comprising a plurality of secondary bits as part of a data line that includes the first target data to be stored via the write operation, and wherein the additional information comprising the plurality of secondary bits includes the first MAC.

14. The apparatus of claim 8, wherein to perform the first read operation includes further to:

extract the first MAC from a data line that belongs to the first VM and that includes the first target data retrieved from the first physical memory address.

15. A method for cryptographic memory isolation, the method comprising:
- executing each of a plurality of instructions via one or more processors, each instruction being associated with a virtual machine (VM) of multiple virtual machines (VMs) being executed by the one or more processors;
- performing one or more write operations via memory circuitry communicatively coupled to the one or more processors, wherein a write operation of the one or more write operations that is associated with a first VM of the multiple VMs includes generating a first message authentication code (MAC) based on a combination of at least first target data to be stored via the write operation, a first cryptographic key that is specific to the first VM of the multiple VMs, and a first physical memory address for the first target data;
- performing, subsequent to the write operation, a first read operation associated with the first VM of the multiple VMs;
- generating a second message authentication code (MAC) based on a combination of at least the first target data retrieved from the first physical memory address, the first cryptographic key that is specific to the first VM of the multiple VMs, and the first physical memory address;
- comparing the first MAC to the second MAC to determine that no integrity failure has occurred;
- performing, subsequent to the write operation, a second read operation at the first physical memory address by a second VM of the multiple VMs;
- generating a third message authentication code (MAC) based on a combination of at least the first target data retrieved from the first physical memory address, a second cryptographic key that is specific to the second VM of the multiple VMs, and the first physical memory address; and
- detecting an integrity failure based on a comparison of the first MAC and the third MAC.

16. The method of claim 15, further comprising encrypting the first target data using a distinct other cryptographic key, and wherein generating the first MAC includes generating the first MAC via one or more cryptographic algorithms.

17. The method of claim 15, wherein the first cryptographic key that is specific to the first VM is associated with one instruction of the plurality of instructions, and wherein the method further comprises initiating the write operation responsive to the one instruction.

18. The method of claim 15, further comprising:
- generating, responsive to the detecting the integrity failure, an error code indicating that the integrity failure has been detected;
- determining an operating mode of the second VM associated with the second instruction; and
- providing the generated error code to a destination that is based on the determined operating mode of the second VM.

19. The method of claim 18, wherein generating the error code includes generating a page fault code, and wherein determining the operating mode of the second VM includes determining that the operating mode is one of a group that includes a trust domain (TD) non-root mode, a TD root mode, a VM extension (VMX) root mode, and a VMX non-root mode.

20. The method of claim 15, wherein performing the write operation further includes storing additional information comprising a plurality of secondary bits as part of a data line that includes the first target data, and wherein the additional information comprising the plurality of secondary bits includes the first MAC.

21. The method of claim 15, further comprising:
- embedding the first MAC in a data line that includes the first target data to be stored via the write operation; and
- extracting the first MAC from the data line that includes the first target data retrieved from the first physical memory address.

* * * * *